UNITED STATES PATENT OFFICE.

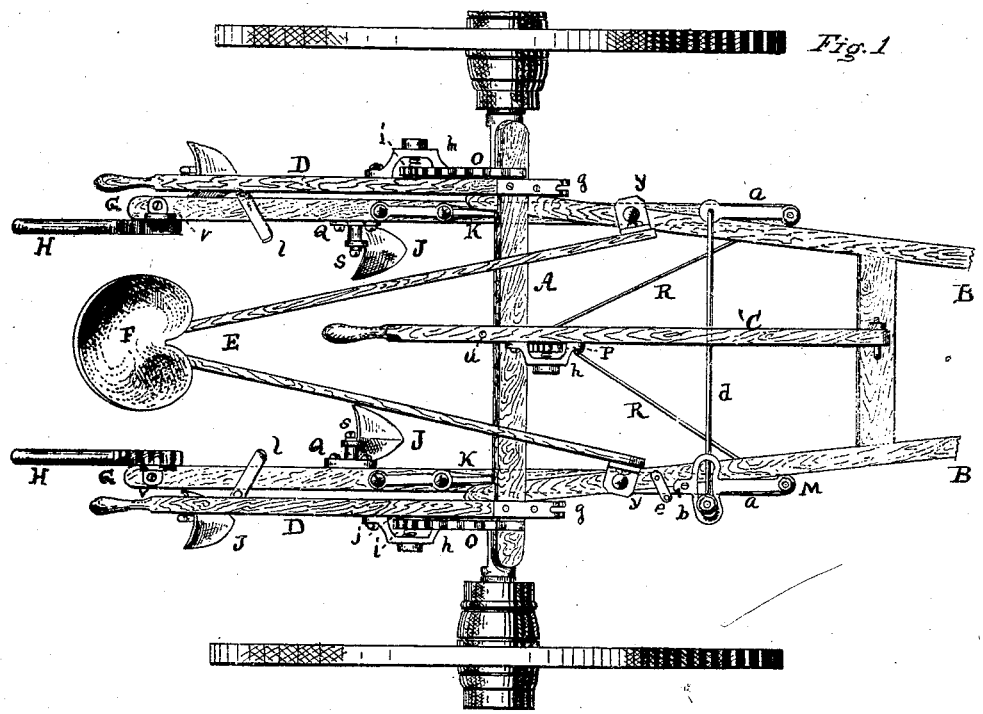

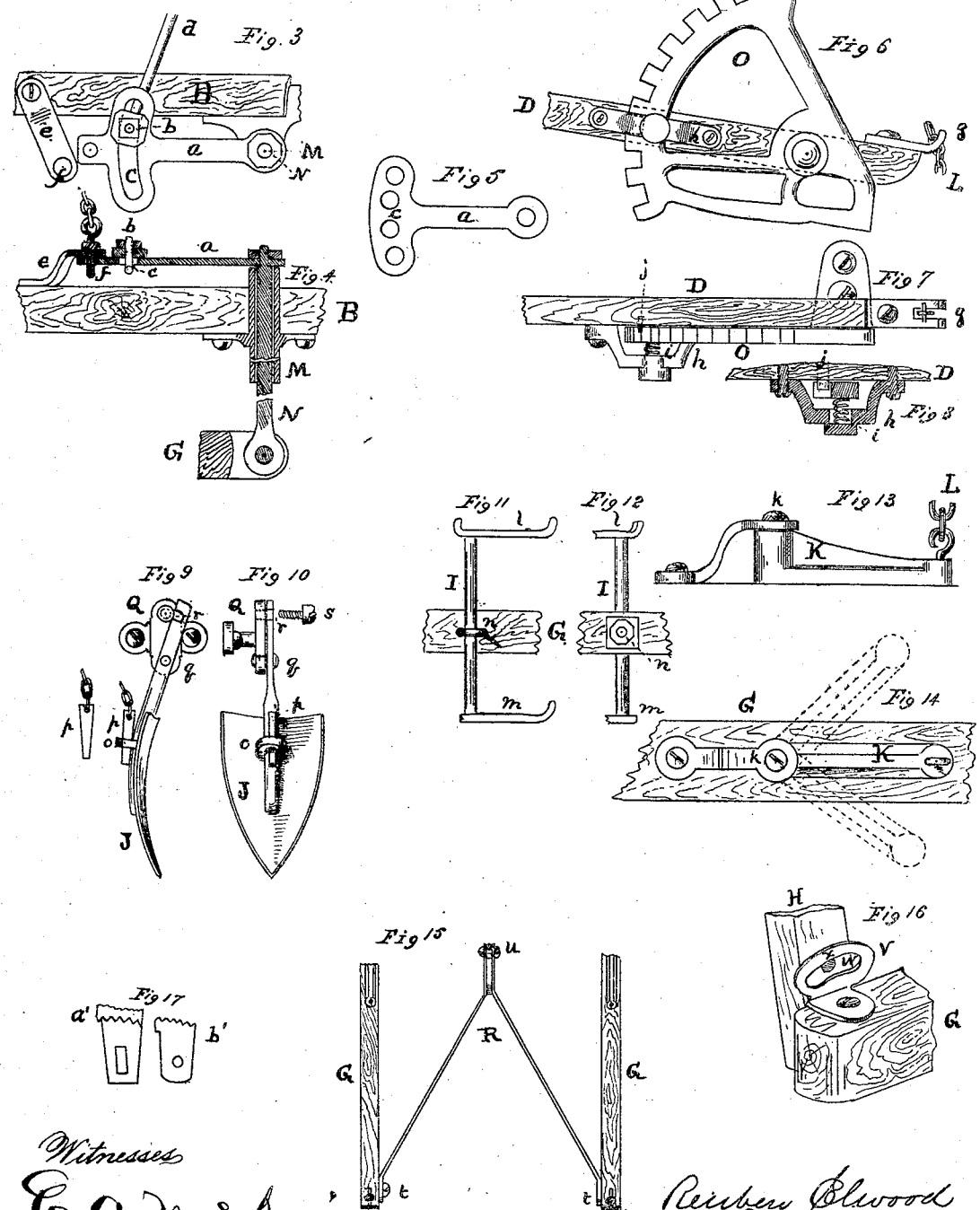

REUBEN ELLWOOD AND RICHARD L. PITCHER, OF SYCAMORE, ILLINOIS.

IMPROVEMENT IN CULTIVATORS.

Specification forming part of Letters Patent No. 140,353, dated July 1, 1873; application filed December 7, 1872.

*To all whom it may concern:*

Be it known that we, REUBEN ELLWOOD and RICHARD L. PITCHER, of Sycamore, in the county of De Kalb and State of Illinois, have invented certain new and useful Improvements in Cultivators, of which the following is a full description, reference being had to the accompanying drawings, consisting of two sheets, in which—

Figure 1 is a top or plan view; Fig. 2, a vertical section; Figs. 3, 4, and 5, details, showing the mode of connecting the plow-beams with the frame; Figs. 6, 7, and 8, details, showing the mode of raising the plows; Figs. 9 and 10, details, showing the mode of connecting the plows to the plow-beams; Figs. 11 and 12, details of the adjustable foot-rests; Figs. 13 and 14, details of the swing-bar for connecting the chains with the plow-beams; Fig. 15, detail, showing the mode of connecting the fifth shovel; Fig. 16, detail, showing the mode of adjustably connecting the plow handles; and Fig. 17, detail, showing the mode of adjusting the pitch of the driver's seat.

The nature of our invention consists in providing the plow-beams with a hinged or swinging bar, to make the connection by means of a chain with the elevating-levers, so that when the plow-beams are swung to either side the plows will not be lifted from the earth; in an improved mode of holding the elevating-lever in position; in an improved attachment for the shovels; in an improved mode of adjusting the seat; and in the application and combination with a cultivator of the several parts hereinafter set forth.

In the drawings, A represents the axles provided with cast skeins for mounting suitable wheels; B, triangular frame forming the tongue; C, lever for raising and lowering the fifth shovel; D, levers for raising the plow-beams; E, adjustable bars on which the driver's seat is mounted; F, seat; G, plow-beams; H, handles; I, adjustable foot-rests; J, plows; J', fifth plow or shovel; K, swing-bar; L, elevating-chain; M, bracket for attaching the plow-beams; N, round rod passing through the bracket M; O, P, racks for holding the levers in position; Q, brackets for attaching plow-standards; R, bars for attaching the fifth shovel; *a*, arm fastened to the upper end of the rod M; *b*, screw-clamp; *c*, slot or hole in the rear end of *a*; *d*, connecting-rod or sway-bar; *e f*, lock; *g*, hooks for connecting the chains L with the levers D; *h*, bracket through which the racks O or P pass; *i*, spring; *j*, pin or stop for holding the levers C or D in position; *k*, pivot with brace for holding the swinging arm K in place; *l*, extension on the upper end, and *m* a similar extension on the lower end, of the adjustable foot-rest I; *n*, eye-bolt for adjusting the foot-rest; *o*, bracket or projection on the back of the shovels or plows J through which the lower ends of the plow-standards pass; *p*, wedges for fastening the shovels to the standards; *q*, pivot by which the plow-standards are connected with the cast bracket Q; *r*, opening in the upper end of the plow-standards; *s*, friction nut or bolt; *t*, bolts by means of which the bars R are pivoted to the front end of the plow-beams; *u*, rod for connecting the bars R with the lever C; *v*, bracket, provided with a slot *w* for adjusting the plow-handles H, by means of the clamp-bolt *x*; *y*, standard, provided with holes for the vertical adjustment of the seat F; *z*, holes for its lateral adjustment; *a'*, serrated plate attached to the seat F; *b'*, a similar plate attached to the bars E, by means of which the pitch of the seat F is adjusted; *c'*, clamp-bolt for holding the seat in position when adjusted. The several parts are made of the usual sizes, and of wood or metal, as desired, or partly of both. The plow-beams are pivoted at their front ends to the rods N, so as to give them a vertical angular movement. The rods N pass through the sleeve M, and are permanently connected at their upper ends with the arms *a*. By loosening the nut *b*, or removing the sway-bar *d*, they have an independent lateral movement. By tightening the nut *b* the lateral movement of both sway-bars is affected, and by connecting the bar *e* with the arm *a* by means of the pin *f*, as shown at Fig. 4, they are made rigid. The arms *a* are shown with a rear projection, but they may be made to project in front, or both front and rear, if desired. Instead of the slot with the clamp-nut *b*, a series of holes, *c*, as shown at Fig. 5, may be used, in which case it is only necessary to insert the bent end of the rod *d* in either of the holes, the same being held in place by means of a set screw or nut. These beams G are lifted from the ground by depressing the levers D with which they are connected by the chains L, which said chains are adjusted as to height by the hooks $g$. The depression of the levers will elevate the plow-beams sufficiently for ordinary purposes; if desired, it can be accomplished by lifting them and adjusting the chains in the hooks $g$. The levers D are held in place by means of the pin $j$, which engages with the teeth of the rack O or P, where they are held by means of the spring or springs $i$. To disengage the pin, the levers are drawn toward the operator or driver, which compresses the springs $i$, when the lever can be moved up or down. When they are released, the springs $i$ will cause the pin $j$ to enter between the teeth and hold the levers where they are placed.

As shown, the racks O are attached to the axle; but if desired the bars B can be extended further to the rear, when they can be made of the form shown at P, and attached to such extended part of the frame.

The chains L are attached to the free end of the swing-bar K, so that the plow-beams can be partly supported on said chain and have a lateral movement, without throwing the plows out of the ground, as by this arrangement the movement in the arc of a circle is obviated, and the plows remain at the same depth when moved to the right or left. The standard of the fifth shovel J' is permanently attached to the bars R, which are pivoted at $t$ to the front end of the plow-beams. This shovel is thrown into or out of use without detaching it from the cultivator, as has heretofore been the practice. The lower ends of the plow-standards are rounded, and the shovels J are adjusted up and down or to the right or left by means of the wedges $p$, which said wedges may, if desired, be provided with a chain or cord to prevent loss. The standards are pivoted to the lower end of the upright portion of the brackets Q, and at their upper ends are provided with a notch or opening, $r$, and a friction-nut or bolt, $s$. I prefer this arrangement, as the leverage of the plows or shovels is much reduced, and they can be held in place with less friction than would be required if the relative positions of the pivot and friction opening were reversed. The brackets Q are made of cast-iron, and firmly bolted to the sides of the plow-beams. The handles H are adjusted so as to be within the reach of a mounted driver, or of an operator walking on the ground; and also to the height of such operator by means of the bracket $v$, which is provided with a slot, $w$, as shown at Fig. 16, and are held to their adjustment by means of a clamp-bolt, $x$. The foot-rests I are provided with lateral extensions for the feet both above and below the plow-beam, and can be raised, lowered, turned, and held in place by means of the eye-bolt $n$, as shown at Figs. 11 and 12, so that any nice adjustment as to height or position can be had. The bars E, upon which the driver's seat is placed, rest loosely upon the axle A, and the seat is adjusted as to height by means of the holes in the standard $y$, and as to longitudinal position by means of the holes $z$ in their front ends, and are easily removed when the machine is to be used as a walking cultivator.

The pitch of the seat F is adjusted by loosening the bolt $c'$, when it can be slightly raised so as to disengage the teeth. When the proper pitch is obtained it is dropped so that the teeth again engage with each other, and the bolt $c'$ tightened so that it will remain in the position to which it has been adjusted.

We are aware that adjustable seats and handles, friction plow-standards, and foot-rests have heretofore been applied to cultivators. We do not, therefore, claim any of these parts broadly; but What we do claim as new is as follows:

1. The combination and arrangement of the beams G, rods N, and brackets M, with the arms $a$, provided with the slot or holes $c$ and rod $d$, substantially as and for the purposes specified.

2. The combination and arrangement of the beam G, rods N, brackets M, with the arms $a$, rod $d$, and locking device $e f$, substantially as described.

3. The swing-bar K, in combination with a beam, G, and chains L, substantially as specified.

4. The combination of the rack with the bracket $h$ by spring $i$ and pin $j$ of the lever, constructed and operating substantially as described.

5. The foot-rest I, when provided with projections above and below the plow-beam, in combination with the clamp $n$, so that it can be both vertically and laterally adjusted, substantially as described.

REUBEN ELLWOOD.
RICHARD L. PITCHER.

Witnesses:
E. A. WEST,
O. W. BOND.